3,222,200
COMPOSITIONS FOR IMPARTING WATER-REPELLENT PROPERTIES TO FIBROUS MATERIALS
Harold Garton Emblem, 51 Middlehurst Road,
Grappenhall, England
No Drawing. Filed Dec. 28, 1960, Ser. No. 78,823
Claims priority, application Great Britain, Jan. 8, 1960, 748/60
9 Claims. (Cl. 106—271)

This invention relates to compositions for imparting water-repellent properties to fibrous materials, more especially textile materials. The invention also relates to processes for treating fibrous materials with such compositions.

According to the invention there is provided a composition suitable for treating fibrous materials to impart water-repellent properties thereto comprising an aminoalkyl silicate and a wax in solution in a mutual solvent.

The silicates that may be used can be orthosilicates of the general formula $Si(OR_1)_x(OR_2)_{4-x}$ where $R_1$ is an alkyl group with a substituent amino group, $R_2$ is an unsubstituted alkyl group, and $x$ has the value 1, 2, 3 or 4; they an be polysilicates of the empirical or unit formula $(R_1O)_y(R_2O)_{2-y}SiO$ where $R_1$ and $R_2$ have the above meanings and $y$ has a value greater than zero and up to 2; or they can be mixtures of orthosilicates and polysilicates.

The aminoalkyl groups of the silicate are suitably those derived from an aminoalcohol of the formula:

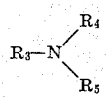

where $R_3$ is a mono- or di-hydroxyalkyl group containing 1 to 6 carbon atoms; $R_4$ and $R_5$, which may be the same or different, are hydrogen, or an alkyl or monohydroxyalkyl group containing 1 to 6 carbon atoms; the total number of hydroxyl groups of the alcohol not exceeding three. Preferably the number of hydroxyl groups of the alcohol is one or two. As examples of such alcohols may be mentioned those in which $R_3$ is a monohydroxyalkyl group with 2 to 6 carbon atoms; and $R_3$ and $R_5$ are hydrogen or an alkyl or monohydroxyalkyl group with 1 to 4 carbon atoms. If $R_4$ is hydroxyl substituted it preferably contains only 2 or 3 carbon atoms and furthermore $R_5$ is then preferably hydrogen.

If the silicate contains unsubstituted groups $R_2O$— these may contain 1 to 10 carbon atoms, and may be, for example, methoxy, ethoxy, propoxy, isopropoxy and hexoxy groups. In such instances, for polysilicates the value of $y$ in the above formula is preferably at least 0.1, that is the polysilicates should contain at least 0.1 aminosubstituted ester groups per silicon atom.

The aminoalkyl silicates can be prepared by interchange processes from alkyl silicates by which the alkyl groups, or some of them, are replaced by aminoalkyl groups. Thus, for example, the alkyl groups of methyl or ethyl orthosilicates can be partly or wholly replaced by aminoalkyl groups by heating the esters at an elevated temperature under reflux with an appropriate amount of an aminoalcohol comprising a primary, secondary or tertiary amino group and removing by distillation the methyl and ethyl alcohols as they are formed. When the amino alcohol used in the interchange process is of higher boiling point than the alcohol which it replaces, the replaced alcohol can be removed as it is formed, while unreacted aminoalcohol remains to continue replacement.

Orthosilicates of the formula $Si(OR_1)_x(OR_2)_{4-x}$ where $R_1$ and $R_2$ have the previous meanings and $x$ is equal to 1, 2 or 3 can be prepared by an interchange reaction between the tetra-aminoalkyl orthosilicate, $Si(OR_1)_4$, and the alcohol, $R_2OH$, in those cases where the alcohol, $R_2OH$, has a higher boiling point than the displaced amino-alcohol, $R_1OH$. Thus, for example, 2-aminoethyl trinonyl orthosilicate, $Si(OCH_2CH_2NH_2)(OC_9H_{19})_3$ (in admixture with the silicates $$Si(OCH_2CH_2NH_2)_2(OC_9H_{19})_2$$

and $Si(OCH_2CH_2NH_2)_3(OC_9H_{19})$, can be prepared by heating under partial reflux 2-aminoethyl orthosilicate and nonyl alcohol and gradually distilling off the displaced ethanolamine until the reaction has proceeded to the appropriate extent.

Similar interchange processes can be carried out with the corresponding polysilicates, or mixtures of them with the orthosilicates.

It will be appreciated that an aminoalkyl silicate having a desired content of aminoalkyl groups may be produced from a similar aminoalkyl silicate in which the proportion of aminoalkyl groups is less than that of the desired product by reacting the material with a suitable amount of the appropriate aminoalcohol to increase the aminoalkyl group content of the initial material.

When an interchange reaction is carried out with only partial replacement of alkyl or aminoalkyl groups in an alkyl or aminoalkyl silicate by aminoalkyl or alkyl groups, respectively, the mixed esters which are formed cannot usually be isolated by distillation, for in most instances disproportionation occurs and each mixed ester gives rise to a mixture of esters.

The extent of the interchange of the organic groups of an alkyl or aminoalkyl silicate whether the silicate be orthosilicate, polysilicate or a mixture of orthosilicate and polysilicate, is conveniently expressed in terms of the number of aminoalkyl groups present in the final product per silicon atom. For any particular organic silicate material the quantity of aminoalcohol, for example, required to give a predetermined degree of interchange can be calculated from the silica content of the material concerned. Thus, for example, if it is required to produce by an interchange reaction between an alkyl silicate and an aminoalcohol a product in which there is one aminoalkyl group per silicon atom, then the reaction components are employed in the proportion of 1 g. mol. of aminoalcohol to that weight of organic silicate which contains 1 g. mol. of silica.

The wax employed in compositions according to the invention may be a natural or synthetic wax, i.e. esters of higher monobasic acids with higher mono- or di-valent alcohols, or a wax-like compound, that is, a solid hydrocarbon or a mixture of solid hydrocarbons or a soluble polyethylene; both of these classes of compounds are referred to herein as waxes. Waxes suitable for use are vegetable waxes, such as carnauba, japan, candelilla, palm and ouricury; insect waxes such as beeswax; petroleum waxes such as paraffin and ceresin waxes; and synthetic waxes such as synthetic paraffins. Blends of these waxes may be employed.

The preferred waxes are those soluble in dry-cleaning media such as white spirit, trichloroethylene, carbon tetrachloride and tetrachloroethylene. Such waxes are the paraffin and synthetic paraffin waxes. By the choice of compositions employing such a solvent and soluble wax, textile materials may be dry-cleaned and water-repellent properties imparted to them by the use of the same agent.

The composition may, however, be applied before a dry-cleaning operation but in this case it is necessary to employ a wax which is substantially insoluble in the dry-cleaning medium subsequently employed. Thus with, for example, the dry-cleaning materials referred to, the wax may be a vegetable or insect wax or a synthetic wax insoluble in the dry-cleaning media and the mutual solvent for the wax and silicate may be an ester-type solvent such as ethyl and amyl acetates, benzene, or a mono-ether of ethylene glycol of the formula RO—C$_2$H$_4$—OH where R is methyl, ethyl, isopropyl or butyl.

As a further possibility, the composition may be applied to a textile fabric after it has been dry-cleaned and in this case any of the various waxes referred to may be employed.

The silicate may, for example, be an aminoalkanol-substituted ethyl or isopropyl polysilicate. Thus the silicate may be an ethyl polysilicate in which some of the ethyl groups are replaced by interchange with monoethanolamine, monoisopropanolamine, 2-amino-2-methyl-propan-1-ol or 2-amino-butan-1-ol; in such instances preferably sufficient aminoalcohol is employed in the interchange process to produce a product in which there are from 0.5 to 1.5, for example from 0.75 to 1.0, aminoalkyl groups per silicon atom. For isopropyl polysilicates the preferred substituent aminoalkyl group is the 2-amino-2-methyl-prop-1-yl group, there being preferably sufficient of the corresponding aminoalcohol employed in the interchange reaction to produce a product in which there are 0.1 to 0.3, for example about 0.2, amino-substituted ester groups per silicon atom.

Although waxes and aminoalkyl silicates when used separately impart poor water-repellency to textile and other fibrous materials, it has been found that a wax and an aminoalkyl silicate when used in combination exert a synergistic effect and that a composition comprising both materials in solution in a mutual solvent has water-repellency imparting properties which exceed to a surprising extent those exhibited by solutions of either a wax or an aminoalkyl silicate.

Suitable compositions are those comprising at least 2%, preferably at least about 3%, of aminoalkyl silicate and at least 2%, preferably at least about 3%, of paraffin wax, the percentages being by weight of the composition; solutions which are saturated with the two components at the temperature at which they are utilised may also be employed. Particularly suitable compositions are those comprising 2.5 to 8% of aminoalkyl silicate and 2.5 to 8% of paraffin wax.

The textile materials that can be treated can comprise natural or synthetic fibres or both.

The composition may be used for imparting water-repellency to fibrous materials other than textiles, such as paper and wood.

The invention also relates to processes which comprise treating a fibrous material with a composition in accordance with the invention. A textile may be treated by soaking it in the composition, removing excess and then drying the textile. It is necessary to effect hydrolysis of the aminoalkyl silicate after application to the fibrous material. This hydrolysis may take place through the action of atmospheric moisture or by some separate treatment with water, such as immersion in water, or by the action of steam when the treated fabrics are steam-pressed. For waxes other htan petroleum waxes and synthetic hydrocarbon waxes, a hydrolysis treatment with water or steam is usually necessary to obtain satisfactory results; such treatment may also give improved results when petroleum and synthetic hydrocarbon waxes are employed.

The invention is illustrated by the following examples. All parts are by weight.

EXAMPLE 1

This example concerns the preparation of monoethanolamine-substituted ethyl polysilicate.

Ethyl polysilicate having a silica content of 40% (134 g., free of orthosilicate), was condensed with monoethanolamine (45.75 g., 0.75 mol., the equivalent of 0.375 of the ethyl groups in the silicate) by heating and maintaining the mixture under partial reflux by a fractionating column allowing gradual distillation of the replaced ethyl alcohol. During three hours, the theoretical quantity of alcohol was recovered, leaving a monoethanolamine ethyl polysilicate which is referred to hereinafter as silicate A. This silicate was insoluble in white spirit. It contained about 0.75 aminoalkyl group per silicon atom.

EXAMPLE 2

The process of Example 1 was repeated using 0.75 mol. of monoisopropanolamine instead of the monoethanolamine. The silicate obtained is referred to hereinafter as silicate B.

EXAMPLE 3

The process of Example 1 was again repeated using 0.75 mol of 2-amino-butan-1-ol in place of the monoethanolamine; the product became cloudy on cooling. The silicate obtained is referred to hereinafter as silicate C; it was soluble in both white spirit and tetrachloroethylene.

EXAMPLE 4

The process of Example 1 was again repeated using 1 mol of 2-amino-butan-1-ol in place of the monoethanolamine; the product was clear. This silicate is referred to hereinafter as silicate D; it was soluble in both white spirit and tetrachloroethylene. The product contained about 1.0 aminoalkyl group per silicon atom.

EXAMPLE 5

The process of Example 1 was again repeated using 1 mol. of 2-amino-2-methyl-propan-1-ol in place of the monoethanolamine. This silicate is referred to hereinafter as silicate E; it was miscible with white spirit and tetrachloroethylene.

EXAMPLE 6

The preparation of an isopropyl polysilicate will be first described. A mixture of isopropyl alcohol (232.6 g.) and distilled water (17.3 ccs.), was slowly added to silicon tetrachloride (170 g.), the amount of water corresponding to 0.96 mol. per mol. of the tetrachloride. When addition was complete, the mixture was refluxed for one hour and left overnight. Excess isopropyl alcohol (137.5 g.) was then removed by distillation up to 100° C., leaving a substantially neutral isopropyl silicate having a silica content of 38.05%. The orthosilicate content was 5.4%.

162 grams of the isopropyl polysilicate and 0.2 gram mol. of 2-amino-2-methyl-propan-1-ol were heated in a flask fitted with a fractionating column and condenser, so that isopropyl alcohol could be slowly distilled off. The theoretical quantity of isopropyl alcohol was distilled off in 2 hours. The product, which contained about 0.2 aminoalkyl group per silicon atom, is termed hereinafter silicate F.

EXAMPLE 7

This example concerns the treatment of cloth to make it water-repellent employing a composition comprising silicate A or silicate B.

The composition was obtained by dissolving in 89 parts of tetrachloroethylene, 3.5 parts of the silicate (A or B) and 7.5 parts of paraffin wax.

A piece of cotton was soaked with the composition, excess pressed out and then dried in an oven at about 100° C.; during the drying atmospheric moisture caused hydrolysis of the aminoalkyl silicate to take place.

Both silicates A and B gave good results. Good results were also obtained with wool fabric which could be dry-cleaned successfully.

Samples of cotton fabric treated with the composition and untreated cloth were soiled and then dry-cleaned. The samples treated dry-cleaned as well as the untreated cloth. Most of the water-repellency was removed, but the samples could be re-treated successfully.

EXAMPLE 8

This example concerns the treatment of cloth to make it water-repellent employing compositions comprising the silicates C, D and E. The composition was obtained by dissolving in 88.5 parts of tetrachloroethylene (or white spirit), 4 parts of the silicate (C, D or E) and 7.5 parts of paraffin wax.

Each of the products C, D and E gave good water-repellent properties to cloth when the cloth was treated with the compositions by the method described in Example 7. Water applied to the cloth formed drops which remained in droplet form for more than 2 hours. Good results were also obtained with wool fabric which could be dry-cleaned successfully.

Samples of cotton fabric treated with the composition and untreated cloth were soiled and then dry-cleaned. The samples treated dry-cleaned as well as the untreated cloth. Most of the water-repellency was removed, but the samples could be re-treated successfully.

EXAMPLE 9

This example concerns the treatment of cloth with a composition comprising silicate F.

The composition was obtained by dissolving in 88.8 parts of tetrachloroethylene, 3.7 parts of silicate F and 7.5 parts of paraffin wax.

Cloth treated with this composition by the method described in Example 7 had good water-repellent properties, water applied to the fabric forming drops which remained in droplet form for more than two hours. Good results were also obtained with wool fabric which could be dry-cleaned successfully.

Samples of cotton fabric treated with the composition and untreated cloth were soiled and then dry-cleaned. The samples treated dry-cleaned as well as the untreated cloth. Most of the water-repellency was removed, but the samples could be re-treated successfully.

EXAMPLE 10

This example also concerns the treatment of cloth with a composition comprising silicate F.

A composition was obtained by dissolving in 90 parts of tetrachloroethylene, 5 parts of silicate F and 5 parts of paraffin wax. Cloth treated with this composition by the method described in Example 7 had good water-repellent properties, water applied to the cloth forming drops which remained in droplet form for more than two hours. Good results were also obtained with wool fabric which could be dry-cleaned successfully.

Samples of cotton fabric treated with the composition and untreated cloth were soiled and then dry-cleaned. The samples treated dry-cleaned as well as the untreated cloth. Most of the water-repellency was removed, but the samples could be re-treated successfully.

EXAMPLE 11

A composition was prepared consisting of a solution of 3 parts of silicate F and 3 parts of paraffin wax in 94 parts of tetrachloroethylene. A sample of cotton fabric was treated as described in Example 7. On applying water to the fabric, drops were formed which remained in droplet form on the surface for more than 2 hours.

EXAMPLE 12

A composition was prepared consisting of a solution of 3 parts of silicate F and 5 parts of paraffin wax in 92 parts of tetrachloroethylene. A sample of cotton fabric was treated as described in Example 7. On applying water to the fabric, drops were formed which remained in droplet form on the surface for more than two hours.

EXAMPLE 13

A piece of cotton was soaked in the composition of Example 7 using silicate A. Excess of the composition was pressed out, and the treated cotton immersed in water at room temperature, then dried in an oven at about 100° C. A good water-repellent effect was obtained, which showed some resistance to washing with soap.

EXAMPLE 14

In order to illustrate the fact that the aminoalkyl silicate and paraffin wax combinations employed in the compositions of Examples 7 to 13 exert a synergistic effect, experiments will now be described which showed that poor results are obtained with the use of an aminoalkyl silicate in the absence of a wax and of a wax in the absence of an aminoalkyl silicate.

Experiment 1

4 parts of silicate D were dissolved in 88.5 parts of tetrachloroethylene and the composition used to treat cloth by the method described in Example 7. The treated cloth was weakly water-repellent. A similar result was obtained when the amount of silicate was increased to 10 parts.

Experiment 2

4 parts of silicate E were dissolved in 88.5 parts of tetrachloroethylene and the composition used to treat cloth by the method described in Example 7. The treated cloth was weakly water-repellent. A similar result was obtained when the amount of silicate was increased to 10 parts.

Experiment 3

A saturated solution of paraffin wax in tetrachloroethylene was prepared (the composition containing about 8% by weight of the wax) and the composition used to treat cloth by the method described in Example 7. The treated cloth had poor water-repellent properties.

In contrast with the poor water-repellent properties of materials after treatment with the compositions employed in these experiments, the compositions of Example 8 comprising silicate D or E in combination with paraffin wax gave surprisingly improved water-repellency to the materials.

EXAMPLE 15

A composition was prepared by dissolving three parts or carnauba wax and six parts of silicate F in 200 parts of benzene. Cloth treated with this composition by soaking with the composition, pressing out excess, and drying in an oven to about 100° C. had poor water-repellency. However, a good water-repellent effect was obtained when the treated cloth was immersed in water at room temperature before being dried in an oven at about 100° C. Water applied to the cloth formed droplets which remained in droplet form for about two hours.

The paraffin wax used in the examples was a microcrystalline wax of congealing point about 71° C.

By the term "consisting essentially of" as used in the following claims, it is meant to include compositions containing the named ingredients in the proportions stated and any other ingredients which do not destroy the usefulness of the compositions for the purposes stated in the specification.

What is claimed is:

1. A solution suitable for imparting water-repellent properties to a fibrous material, said solution consisting essentially of:
    (a) an aminoalkyl silicate consisting of monoethanolamine ethyl polysilicate,
    (b) a wax consisting of paraffin wax, and
    (c) an organic mutual solvent for said aminoalkyl silicate and wax, said solvent consisting of tetrachloroethylene,
    (d) said aminoalkyl silicate being present in said organic mutual solvent in an amount between about 2 and 8% by weight,
    (e) said wax being present in said organic mutual solvent in an amount between about 2 and 8% by weight.

2. A solution suitable for imparting water-repellent properties to a fibrous material, said solution consisting essentially of:
    (a) an aminoalkyl silicate consisting of monoisopropylamine ethyl polysilicate, (b) a wax consisting of paraffin wax, (c) an organic mutual solvent for said aminoalkylsilicate and wax, said solvent consisting of tetrachloroethylene, (d) said aminolkylsilicate being present in said organic mutual solvent in an amount between about 2 and 8% by weight, (e) said wax being present in said organic mutual solvent in an amount between about 2 and 8% by weight.

3. A solution suitable for imparting water-repellent properties to a fibrous material, said solution consisting essentially of:

(a) an aminoalkyl silicate consisting of 2-aminobutan-1-ol ethyl polysilicate, (b) a wax consisting of paraffin wax, (c) an organic mutual solvent for said aminoalkyl silicate and wax, said solvent consisting of tetrachloroethylene, (d) said aminoalkyl silicate being present in said organic mutual solvent in an amount between about 2 and 8% by weight, (e) said wax being present in said organic mutual solvent in an amount between about. 2 and 8% by weight.

4. A solution suitable for imparting water-repellent properties to a fibrous material, said solution consisting essentially of:

(a) an aminoalkyl silicate consisting of 2-amino-2-methyl-propan-1-ol isopropyl polysilicate, (b) a wax consisting of paraffin wax, (c) an organic mutual solvent for said aminoalkyl silicate and wax, said solvent consisting of tetrachloroethylene, (d) said aminoalkyl silicate being present in said organic mutual solvent in an amount between about 2 and 8% by weight, (e) said wax being present in said organic mutual solvent in an amount between about 2 and 8% by weight.

5. A solution suitable for imparting water-repellent properties to a fibrous material, said solution consisting essentially of:

(a) an aminoalkyl silicate, (b) a wax, and (c) an organic mutual solvent for said aminoalkyl silicate and wax, (d) said aminoalkyl silicate being present in said organic mutual solvent in an amount between about 2% by weight and the amount required to saturate said organic mutual solvent at the temperature of use, (e) said wax being present in said organic mutual solvent in an amount between about 2% by weight and the amount required to saturate said organic mutual solvent at the temperature of use, (f) the aminoalkyl groups of said silicate being derived from an aminoalcohol of the formula:

wherein $R_3$ is selected from the group consisting of mono- and di-hydroxyalkyl radicals containing 1 to 6 carbon atoms, $R_4$ and $R_5$ are selected from the group consisting of hydrogen and alkyl and monohydroxyalkyl radicals containing 1 to 6 carbon atoms, the total number of hydroxy groups of the alcohol not exceeding 3, any other ester groups present in the silicate being alkoxy groups containing 1 to 10 carbon atoms and the number of aminoalkyl groups in the silicate being at least 0.1 per silicon atom.

6. A solution suitable for imparting water-repellent properties to a fibrous material, said solution consisting essentially of:

(a) an aminoalkyl silicate, (b) a wax, and (c) an organic mutual solvent for said aminoalkyl silicate and wax, (d) said aminoalkyl silicate being present in said organic mutual solvent in an amount between about 2 and 8% by weight, (e) said wax being present in said organic mutual solvent in an amount between about 2 and 8% by weight, (f) the aminoalkyl groups of said silicate being derived from an aminoalcohol of the formula:

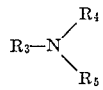

wherein $R_3$ is selected from the group consisting of mono- and di-hydroxyalkyl radicals containing 1 to 6 carbon atoms, $R_4$ and $R_5$ are selected from the group consisting of hydrogen and alkyl and monohydroxyalkyl radicals containing 1 to 6 carbon atoms, the total number of hydroxy groups of the alcohol not exceeding 3, any other ester groups present in the silicate being alkoxy groups containing 1 to 10 carbon atoms and the number of aminoalkyl groups in the silicate being at least 0.1 per silicon atom.

7. A composition according to claim 6 wherein said organic mutual solvent is selected from the group consisting of white spirits, trichloroethylene, tetrachloroethylene, carbon tetrachloride, benzene, ethyl acetate, amyl acetate and the monoether of ethylene glycol.

8. A process for imparting water-repellent properties to a fibrous material in which the fibrous material is treated with a composition as claimed in claim 7, the silicate hydrolysed and the material dried.

9. A process as claimed in claim 8 in which the fibrous material is a textile material.

References Cited by the Examiner

UNITED STATES PATENTS

| | | | |
|---|---|---|---|
| 2,669,524 | 2/1954 | Mailander | 106—271 |
| 2,885,419 | 5/1959 | Beinfest et al. | 106—287 |
| 3,110,601 | 11/1963 | Emblem et al. | 106—287 XR |

FOREIGN PATENTS

| | | |
|---|---|---|
| 593,727 | 10/1947 | Great Britain. |
| 612,622 | 11/1948 | Great Britain. |
| 738,589 | 10/1955 | Great Britain. |

OTHER REFERENCES

Warth, A. H.: "Chemistry and Technology of Waxes," 1956, page 856, Reinhold Publishing Co., New York.

ALEXANDER H. BRODMERKEL, *Primary Examiner.*

JOSEPH REBOLD, MORRIS LIEBMAN, *Examiners.*

UNITED STATES PATENT OFFICE
CERTIFICATE OF CORRECTION

Patent No. 3,222,200            December 7, 1965

Harold Garton Emblem

It is hereby certified that error appears in the above numbered patent requiring correction and that the said Letters Patent should read as corrected below.

Column 1, line 43, for "$R_3$" read -- $R_4$ --; column 2, line 7, strike out the comma, and insert instead a closing parenthesis; column 3, line 55, for "htan" read -- than --; column 6, line 42, for "to about" read -- at about --.

Signed and sealed this 6th day of December 1966.

(SEAL)
Attest:

ERNEST W. SWIDER            EDWARD J. BRENNER
Attesting Officer            Commissioner of Patents